United States Patent
Eckardt et al.

(10) Patent No.: US 6,451,230 B1
(45) Date of Patent: Sep. 17, 2002

(54) METHOD FOR INJECTION MOLDING MOLDED PARTS FROM THERMOPLASTIC AND ADDED FLUID

(75) Inventors: Helmut Eckardt, Meinerzhagen; Jurgen Ehritt, Hilchenbach, both of (DE)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/420,704

(22) Filed: Oct. 19, 1999

(30) Foreign Application Priority Data

Oct. 20, 1998 (DE) .......................... 198 48 151

(51) Int. Cl.$^7$ .................. B29C 45/50; B29C 45/56; B29C 45/77
(52) U.S. Cl. .................. 264/40.3; 264/50; 264/328.7; 264/DIG. 83
(58) Field of Search ............... 264/40.5, 40.7, 264/328.7, 40.3, 50, DIG. 83; 425/145, 4 R, 557, 817 R

(56) References Cited

U.S. PATENT DOCUMENTS

| | | | |
|---|---|---|---|
| 3,686,388 A | | 8/1972 | Beckmann et al. .......... 264/237 |
| 3,697,204 A | | 10/1972 | Kyritsis et al. |
| 3,793,416 A | * | 2/1974 | Finkmann et al. ...... 264/328.19 |
| 4,043,715 A | * | 8/1977 | Hendry ......................... 425/4 R |
| 4,211,523 A | * | 7/1980 | Hunerberg .................. 425/145 |
| 4,381,272 A | | 4/1983 | Ehritt ......................... 264/40.3 |
| 4,783,292 A | | 11/1988 | Rogers ....................... 264/40.6 |
| 5,047,183 A | | 9/1991 | Eckardt et al. ............. 264/40.3 |
| 6,322,347 B1 | * | 11/2001 | Xu .............................. 425/4 R |

FOREIGN PATENT DOCUMENTS

| | | | |
|---|---|---|---|
| DE | 1 909 211 | 10/1969 | .......... B29D/27/00 |
| DE | 1964 748 | 7/1971 | .......... B29D/27/00 |
| DE | 3020122 C2 | 4/1984 | .......... B29B/5/06 |
| DE | 3734164 A1 | 4/1989 | .......... B29C/49/06 |
| EP | 0 843 246 A2 | 5/1998 | |
| JP | 06-339974 | 12/1994 | |

* cited by examiner

*Primary Examiner*—Jill L. Heitbrink
(74) *Attorney, Agent, or Firm*—Hamilton, Brook, Smith & Reynolds, P.C.

(57) ABSTRACT

A method for injection molding plastic molded parts from thermoplastic, comprises the following steps: the production of a thermoplastic melt (1) through the rotation of a plasticizing and injection screw (2) in a preplasticizing cylinder (3); the addition to the thermoplastic melt (1) of a fluid (4) by introducing the fluid (4) into the preplasticizing cylinder (3); the mixing up the thermoplastic melt (1) to which the fluid (4) has been added, through the rotational motion of the plasticizing and injection screw (2); the injection of the mixture of thermoplastic melt (1) and fluid (4) into the cavity (8) of an injection molding tool (5). In order to make this method suitable especially for the reliable and reproducible production of large, foamed plastic molded parts, the invention is characterized in that the mixture of thermoplastic melt (1) and fluid (4) is injected into the cavity (8) of an injection molding tool (5) through the translational motion of the plasticizing and injection screw (2), the fluid (4) is introduced into the preplasticizing cylinder (3) at an axial position (6) where the screw channels (7) of the plasticizing and injection screw (2) are situated at least some of the time, and the pressure difference (delta p) between the pressure ($P_F$) of the fluid (4) and the pressure ($p_s$) in the thermoplastic melt (1) is maintained essentially constant while the fluid (4) is being introduced into the preplasticizing cylinder.

33 Claims, 3 Drawing Sheets

METHOD FOR INJECTION MOLDING MOLDED PARTS FROM THERMOPLASTIC AND ADDED FLUID

BACKGROUND OF THE INVENTION

Plastic molded parts have been produced from thermoplastic melt by the interior gas pressure method. This is described, for example, in DE 37 34 164 A1 or the related U.S. Pat. No. 5,047,183. With this method, melt is first injected into the cavity of the injection molding tool, and then nitrogen is injected. The gas forms a cavity in the interior of the melt; while the melt is cooling, the gas pressure presses it against the cavity walls, so that volume contractions due to cooling can be compensated and the surface of the molded part is free of sink marks.

Another previously known method is based on the use of expanding agents to produce so-called structural foams (TSG). The density of resulting plastic structures decreases from outside to inside. With this method, an expanding agent is admixed with the thermoplastic melt in the region of the plasticizing unit. The injection temperature is determined by the so-called kick-off temperature of the particular expanding agent, since it is desired that the expanding agent should foam only in the mold cavity.

Another injection molding method using a gas is known from DE 30 20 122 C2, or the related U.S. Pat. No. 4,381,272. In the disclosed system, the gas is injected directly into the preplasticizing cylinder, and is mixed with the plastic melt. The mixture of plastic melt and gas is then injected into the mold cavity. A plasticizing screw is used for this process, with a special melt storage feature. The method makes it necessary to meter the gas quantity exactly and to control the instant of gas injection exactly, so as to catch the point of lowest material pressure in the screw. The referenced document discloses a circuit arrangement that has two interconnected timing relays.

SUMMARY OF THE INVENTION

Problems exist with each of these techniques in various applications. For example, a disadvantage of the solution proposed by DE 30 20 122 C2 is that axially fixed screws are used, which generally must be specially produced, i.e., being nonstandard components. Another disadvantage is that the method described in DE 30 20 122 C2 is not sufficiently reliable, especially for the precise production of large, expanded molded parts such as plates. In contrast, special expanding agents are required for the TSG technique.

The present invention is directed to a refinement of these previously known injection molding methods. It enhances the reliability of production so that it is possible to produce even large molded parts exactly in a desired mixture of plastic and gas. Furthermore, it should be possible to use the method and its associated apparatus in conventional injection molding machines without significant conversion work.

In general, according to one aspect, the invention features injecting the mixture of thermoplastic melt and fluid into the cavity of an injection molding tool through the translational motion of the plasticizing and injection screw. The fluid is introduced into the preplasticizing cylinder at an axial position where the screw channels of the plasticizing and injection screw are situated at least some of the time. The pressure difference (delta p) between the pressure ($P_F$) of the fluid and the pressure ($p_s$) in the thermoplastic melt is maintained essentially constant while the fluid is being introduced into the preplasticizing cylinder or the volume of the introduced fluid is metered. The of the introduced fluid is metered and/or controlled, so as to maintain the desired pressure difference (delta p).

This procedure achieves the result that the admixture of fluid, especially gas, to the plastic melt is influenced in such a way that the melt-gas mixture can be maintained exactly at a desired consistency. This results from the surprising fact that maintaining a precise pressure difference, e.g. 20 bar, between the higher fluid pressure and the lower melt pressure has a stabilizing effect on the formation of the desired melt-gas mixture.

A first development is characterized in that the pressure ($p_s$) in the thermoplastic melt (1) is maintained at a low level at least while the fluid (4) is being introduced. This tends to assure that the melt-gas mixture will be formed with the desired consistency. The reference quantity for the pressure reduction is the usual pressure prevailing in the screw region during injection molding. According to the invention, this is preferably reduced about 50%. For this purpose, the usual injection molding parameters familiar to a person skilled in the art (e.g. rotational speed of the screw while plasticizing) are appropriately adjusted.

Another development is characterized in that more fluid is added even while the mixture of thermoplastic melt and fluid is being injected into the cavity of the injection molding tool.

The inventive method can operate especially well if a multi-zone screw is used as the plasticizing and injection screw, the fluid being introduced in the region of its screw channels. It is particularly appropriate that the multi-zone screw is a six-zone screw, comprising an input zone, a compression zone, a metering zone, a decompression zone, another compression zone, and an ejection zone.

The above pressure reduction in the region of the screw channels preferably can also be achieved by using a multi-zone screw, such that the decompression zone of the multi-zone screw is situated in the region of the gas input point.

The method advantageously can also be used in conjunction with an injection molding tool with a movable element for changing the volume of the cavity of the mold, that is with a breathing mold. Another possible development is for the injection molding tool to be capable of a stamping process, i.e. a stamping tool is used. A breathing core and a stamping tool also can be combined advantageously. The injection process advantageously is begun with an initial cavity volume of the injection molding tool—the gap between the cavities preferably is 0 mm. The cavity volume is increased during the injection process, and toward the end of the injection process it is reduced again by the execution of a stamping process.

In order to influence the foaming process of the melt-gas mixture in the mold, the invention further provides that this counterpressure can be controlled or regulated in accordance with a given time pattern.

The apparatus for injection molding plastic molded parts from thermoplastic that implements the method comprises the following elements: a preplasticizing cylinder with a plasticizing and injection screw situated therein so as to be movable both rotationally and translationally (axially), to produce a thermoplastic melt. A system for injecting a fluid at an axial injection position of the preplasticizing cylinder is also provided.

According to the invention, the injection fluid system is disposed at an axial position of the preplasticizing cylinder, at which position the screw channels of the plasticizing and injection molding screw are situated at least some of the time, and a melt pressure measurement system provides for measuring the pressure ($p_s$) in the thermoplastic melt in the preplasticizing cylinder. A fluid pressure measurement system measures the pressure ($P_F$) of the fluid. A pressure difference determining system assesses the pressure difference (delta $p = P_F - P_s$) between the pressure ($p_F$) of the fluid and the pressure ($p_s$) in the thermoplastic melt.

A system is also provided to measure and/or meter the volume of the fluid that is introduced into the melt.

Here, too, the injection molding parameters for controlling or regulating the pressure, such as are familiar to a person skilled in the art, are relevant, namely the speed (rpm) of the screw and the axial injection force and injection speed of the screw, and on the other hand, of course, the fluid pressure (gas pressure) itself.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
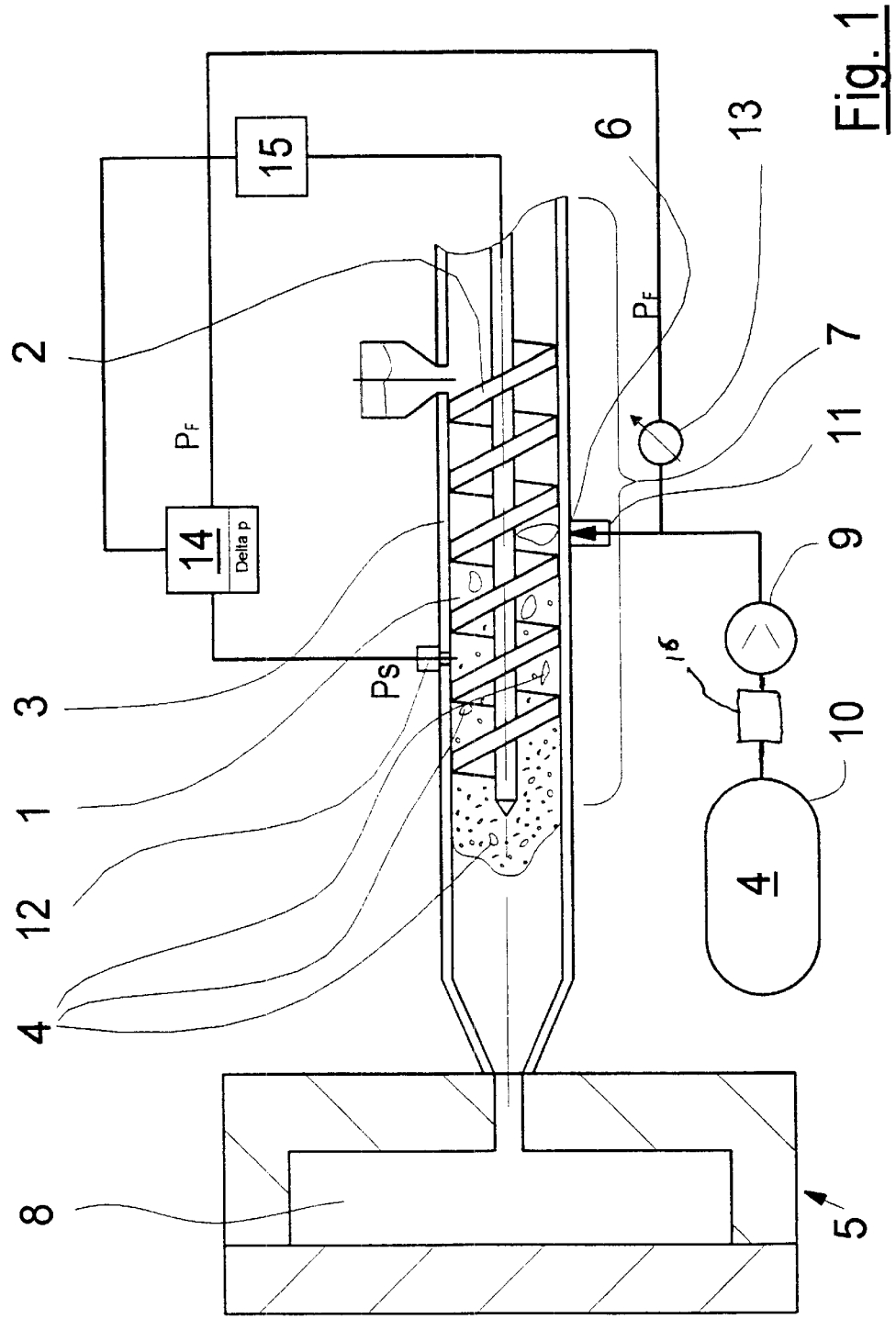
FIG. 1 schematic cross-sectional view of an injection molding machine in which a melt-gas mixture is being produced, while this machine is executing the inventive method.

FIG. 1 shows a section through an injection molding arrangement. A plasticizing and injection screw 2 is disposed rotatably and axially movably in a preplasticizing cylinder 3. To produce a thermoplastic melt 1, the screw 2 at first rotates in the preplasticizing cylinder 3 without an axial motion.

The gas 4 is stored in a supply container 10. It is conducted to a compressor 9, which brings it to the desired pressure. From the compressor 9, the gas is conducted through a line to an injection nozzle 11, which is affixed on the preplasticizing cylinder 3.

A volume control device 16 regulates the volume gas which is injected.

As a result, the gas 4 can be injected, in a controlled manner, through the nozzle 11 into the preplasticizing cylinder 3 and thus into the plastic melt 1. Of course, this can happen only if the gas pressure $P_F$ is greater than the pressure in the melt $P_s$, i.e., the pressure difference delta $p = P_F - P_S$ must be positive.

It is important for the gas to be injected through the nozzle 11 at an axial position 6 where the screw channels 7 of the screw 2 are situated at least some of the time—namely during the plasticizing of the melt.

Figure 2:
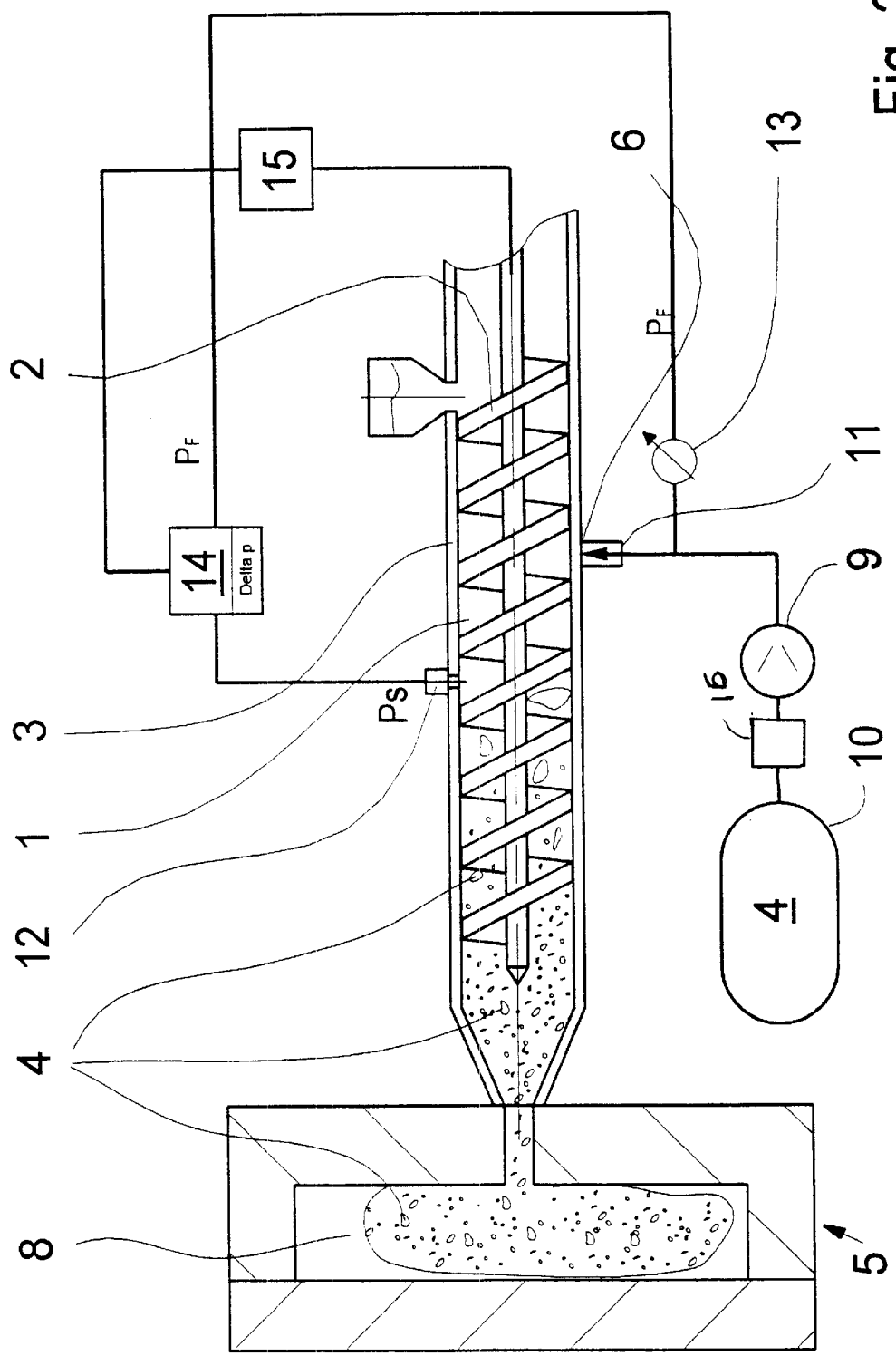
FIG. 2 schematic cross-sectional view of the same arrangement, but now at a later stage of the process, while the mixture is being injected into the mold.

When sufficient melt-gas mixture for a shot has been produced, the mixture can be injected into the cavity 8 of the injection molding tool 5, as is shown in FIG. 2. More gas 4 can be—but does not need to be—injected through the nozzle 11 into the preplasticizing cylinder 3.

To achieve a stable injection molding process, care must be taken to maintain the pressure difference delta p essentially constant, or at least within a given tolerance range, e.g. within 2 bar.

For this purpose, the apparatus is equipped with a pressure sensor, or melt pressure measurement system, 12 to measure the pressure $p_s$ in the melt 1. A manometer, or fluid pressure measurement system, 13 measures the gas pressure $P_F$. A difference forming unit, or pressure difference determining system, 14 determines the pressure difference: delta $p = P_F - P_S$.

The measured pressure difference is provided to the control system 15 of the injection molding machine. In accordance with a program, this control system controls the device so that the pressure difference remains within a given tolerance range. Pressure adjustments or control are achieved by means of the injection molding parameters which for this purpose are familiar to a person skilled in the art. For example, the control changes the speed of rotation of the screw 2 and/or the axial force for injecting the melt applied by the screw 2. It is evident that reducing the injection force will reduce the melt pressure, which constitutes one possibility of adjustment.

On the other hand, the gas pressure $P_F$ also can be appropriately controlled by the controller 15, so as to maintain the desired pressure difference delta p.

Instead of a gas, another fluid, that is a liquid, naturally can also be added to the melt.

The addition of fluid achieves the result that a molded part without any sink marks is produced from a plastic-gas mixture. In this way, especially large, expanded plastic plates can be produced reliably and economically.

Furthermore, existing injection molding machines can be very simply converted to this method.

To prevent the plastic-gas or plastic-liquid mixture in the cavity from foaming prematurely, a counterpressure can be built up in the cavity before injecting the mixture; a gas cushion is thus set against the flow front of the melt. In this way, the foaming process can be controlled or regulated.

Figure 3:
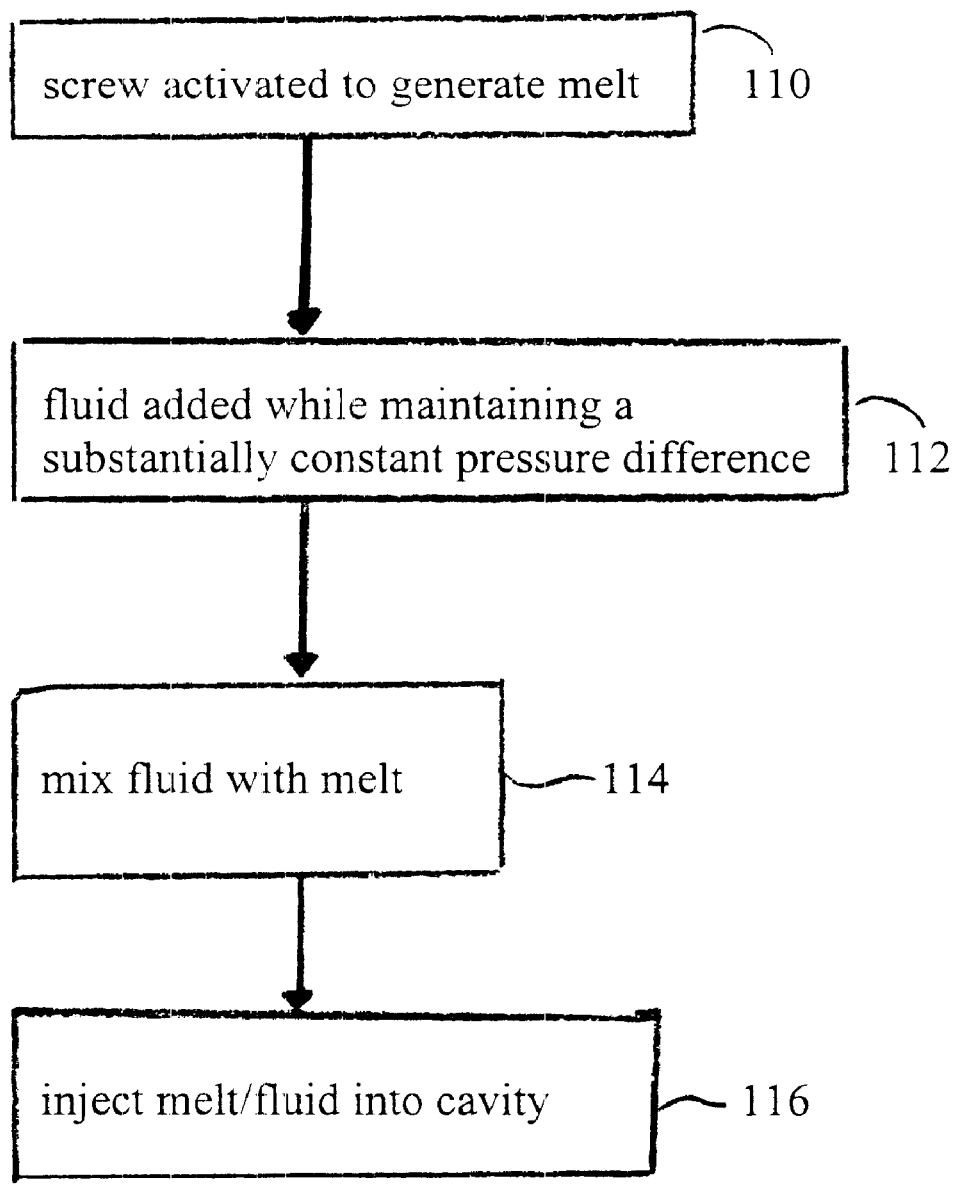
FIG. 3 is a flow diagram illustrating the inventive molding process.

FIG. 3 is a process diagram illustrating the preferred method for injection molding to create plastic molded parts, which is, performed according to the principles of the present invention.

First, in step 110, the controller activates the plasticizing and injection screw to rotate in cylinder 3 to begin the production of the thermal plastic melt 1.

Then, fluid 4 is introduced into the thermal plastic melt in the cylinder 3, in step 112. The thermoplastic melt is then mixed with the fluid via the rotation of the screw under the control of the controller 15 in step 114. Typically, this rotation continues throughout the period that the fluid is added to the melt. Specifically, the fluid is introduced into the preplasticizing cylinder 3 at an axial position where the screw channels are situated at least at some point during the screw's axial movement. The controller 15 maintains a pressure difference between the pressure of the fluid and the pressure of the thermoplastic melt, to be essentially constant while the fluid is being introduced into the plasticizing cylinder.

In step 116, the mixture of thermal plastic melt and fluid is injected into the cavity 8 of the injection molding tool via the action, typically axial movement of the screw two in the cylinder 3, under control of the controller 15.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for injection molding plastic molded parts from thermoplastic, comprising the following steps:
   producing a thermoplastic melt through the rotation of a plasticizing and injection screw in a preplasticizing cylinder;
   adding to the thermoplastic melt a fluid by introducing the fluid into the preplasticizing cylinder, the fluid being introduced into the preplasticizing cylinder at an axial position where the screw channels of the plasticizing and injection screw are situated at least some of the time during operation and a pressure difference between the pressure of the fluid and the pressure in the thermoplastic melt being maintained essentially constant by a controller while the fluid is being introduced into the preplasticizing cylinder;
   mixing the thermoplastic melt to which the fluid has been added, through the rotational motion of the plasticizing and injection screw; and
   injecting the mixture of thermoplastic melt and fluid into a cavity of an injection molding tool through the translational motion of the plasticizing and injection screw.

2. The method of claim 1, further comprising maintaining the pressure in the thermoplastic melt at a low level at least while the fluid is being introduced.

3. The method of claim 1, further comprising adding more fluid while the mixture of thermoplastic melt and fluid is being injected into the cavity of the injection molding tool.

4. The method of claim 1, wherein the screw is a multi-zone screw and the fluid is introduced in the region of its screw channels.

5. The method of claim 4, wherein the multi-zone screw is a six-zone screw, comprising an input zone, a compression zone, a metering zone, a decompression zone, another compression zone, and an ejection zone.

6. The method of claim 1, wherein the injection molding tool contains a movable element to change the volume of the cavity of the injection molding tool.

7. The method of claim 1, wherein the injection molding tool is capable of a stamping process.

8. The method of claim 7, wherein the injection process begins at an initial cavity volume of the injection molding tool, and the cavity volume of the injection molding tool is then increased during the injection process and again decreased toward the end of the injection molding process, through the execution of a stamping process.

9. The method of claim 1, wherein a counterpressure is built up and maintained in the cavity at least some of the time while the mixture of thermoplastic melt and fluid is being injected into the cavity of the injection molding tool.

10. The method of claim 9, wherein the counterpressure is controlled or regulated in accordance with a given time format.

11. The method of claim 1, wherein the pressure difference is controlled by controlling the pressure of the fluid.

12. A method for injection molding plastic molded parts from thermoplastic, comprising the following steps:
   producing a thermoplastic melt through the rotation of a plasticizing and injection screw in a preplasticizing cylinder;
   adding to the thermoplastic melt a fluid by introducing the fluid into the preplasticizing cylinder at an axial position where screw channels of the plasticizing and injection screw are situated at least some of the time;
   metering a volume of the fluid while the fluid is being introduced into the preplasticizing cylinder;
   measuring a pressure difference between the pressure of the fluid and the pressure of the thermoplastic melt;
   maintaining the pressure difference substantially constant with a controller;
   mixing up the thermoplastic melt to which the fluid has been added, through the rotational motion of the plasticizing and injection screw; and
   injecting the mixture of thermoplastic melt and fluid into a cavity of an injection molding tool through the translational motion of the plasticizing and injection screw.

13. The method of claim 12, further comprising maintaining the pressure in the thermoplastic melt at a low level at least while the fluid is being introduced.

14. The method of claim 12, further comprising adding more fluid while the mixture of thermoplastic melt and fluid is being injected into the cavity of the injection molding tool.

15. The method of claim 12, wherein the screw is a multi-zone screw and the fluid is introduced in the region of its screw channels.

16. The method of claim 15, wherein the multi-zone screw is a six-zone screw, comprising an input zone, a compression zone, a metering zone, a decompression zone, another compression zone, and an ejection zone.

17. The method of claim 12, wherein the injection molding tool contains a movable element to change the volume of the cavity of the injection molding tool.

18. The method of claim 12, wherein the injection molding tool is capable of a stamping process.

19. The method of claim 18, wherein the injection process begins at an initial cavity volume of the injection molding tool, and the cavity volume of the injection molding tool is then increased during the injection process and again decreased toward the end of the injection molding process, through the execution of a stamping process.

20. The method of claim 12, wherein a counterpressure is built up and maintained in the cavity at least some of the time while the mixture of thermoplastic melt and fluid is being injected into the cavity of the injection molding tool.

21. The method of claim 20, wherein the counterpressure is controlled or regulated in accordance with a given time format.

22. A method for injection molding plastic molded parts from thermoplastic, comprising the following steps:
   producing a thermoplastic melt through the rotation of a plasticizing and injection screw in a preplasticizing cylinder;
   adding to the thermoplastic melt a fluid by introducing the fluid into the preplasticizing cylinder;
   introducing the fluid into the preplasticizing cylinder at an axial position where the screw channels of the plasticizing and injection screw are situated at least some of the time;
   maintaining, with a controller, a pressure difference between a pressure of the fluid and a pressure in the thermoplastic melt essentially constant while the fluid is being introduced into the preplasticizing cylinder such that the volume of the introduced fluid is metered and/or controlled, so as to maintain the desired pressure difference;

A mixing up the thermoplastic melt to which the fluid has been added, through the rotational motion of the plasticizing and injection screw; and injecting the mixture of thermoplastic melt and fluid into a cavity of an injection molding tool through the translational motion of the plasticizing and injection screw.

23. The method of claim 22, further comprising maintaining the pressure in the thermoplastic melt at a low level at least while the fluid is being introduced.

24. The method of claim 22, further comprising adding more fluid while the mixture of thermoplastic melt and fluid is being injected into the cavity of the injection molding tool.

25. The method of claim 22, wherein the screw is a multi-zone screw and the fluid is introduced in the region of its screw channels.

26. The method of claim 25, wherein the multi-zone screw is a six-zone screw, comprising an input zone, a compression zone, a metering zone, a decompression zone, another compression zone, and an ejection zone.

27. The method of claim 22, wherein the injection molding tool contains a movable element to change the volume of the cavity of the injection molding tool.

28. The method of claim 22, herein the injection molding tool is capable of a stamping process.

29. The method of claim 28, wherein the injection process begins at an initial cavity volume of the injection molding tool, and the cavity volume of the injection molding tool is then increased during the injection process and again decreased toward the end of the injection molding process, through the execution of a stamping process.

30. The method of claim 22, wherein a counterpressure is built up and maintained in the cavity at least some of the time while the mixture of thermoplastic melt and fluid is being injected into the cavity of the injection molding tool.

31. The method of claim 30, wherein the counterpressure is controlled or regulated in accordance with a given time format.

32. A method for injection molding plastic molded parts from thermoplastic, comprising the following steps:

producing a thermoplastic melt through the rotation of a plasticizing and injection screw in a preplasticizing cylinder;

adding to the thermoplastic melt a fluid by introducing the fluid into the preplasticizing cylinder;

regulating a pressure difference between the pressure of the fluid and the pressure in the thermoplastic melt so as to be substantially constant while the fluid is being introduced into the preplasticizing cylinder, the pressure difference being regulated by controlling the pressure of the fluid;

mixing the thermoplastic melt to which the fluid has been added, through the rotational motion of the plasticizing and injection screw; and injecting the mixture of thermoplastic melt and fluid into a cavity of an injection molding tool through the translational motion of the plasticizing and injection screw.

33. The method of claim 32, wherein the pressure difference is controlled by controlling the pressure of the fluid.

* * * * *